United States Patent
Bradburn

(10) Patent No.: US 6,707,578 B1
(45) Date of Patent: Mar. 16, 2004

(54) METHOD AND APPARATUS FOR IMPROVING IMAGE PRESENTATION IN A DIGITAL COPIER

(75) Inventor: Brent M. Bradburn, Boise, ID (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/399,613

(22) Filed: Sep. 20, 1999

(51) Int. Cl.$^7$ ................................................ H04N 1/21
(52) U.S. Cl. ...................................... 358/3.07; 358/1.2
(58) Field of Search ................ 358/1.2, 1.9, 3.06–3.09, 358/3.12, 451; 382/298–301

(56) References Cited

U.S. PATENT DOCUMENTS

| 5,450,208 A | 9/1995 | Murata ........................ 358/296 |
| 5,760,921 A | 6/1998 | Miyake ........................ 358/458 |
| 5,819,010 A | 10/1998 | Uchiyama et al. .......... 395/109 |

FOREIGN PATENT DOCUMENTS

| EP | 0528365 A2 | 2/1993 |
| EP | 0748694 A2 | 12/1996 |
| EP | 0782327 A1 | 7/1997 |

OTHER PUBLICATIONS

"Proceedings of the ICIAP 97, 9th International Conference on Image Analysis and Processing", published 1997, pp. 142–149, vol. 1, Biancardi et al, "Improvements to Image Magnification".

"IEEE Transactions on Image Processing", published 1995, pp. 285–195, No. 3, vol. 4, Jenson, K. & Anastassiou, D., "Subpixel Edge Localization and the Interpolation of Still Images".

European Search Report.

*Primary Examiner*—Thomas D. Lee
*Assistant Examiner*—Stephen Brinich

(57) ABSTRACT

The method of the invention improves the presentation of pixel data images in output documents. The method is implemented by a pipeline of image processing actions which, among others, includes an edge evaluation step wherein neighborhoods of pixel data are examined to derive edge values that are indicative of an edge presence in the respective neighborhood. Each edge value is further indicative of the intensity of the edge. The edge evaluation action further determines scaling parameters which enable later distribution of a neighborhood's center pixel tone value to subpixels that are created during a scaling action of the center pixel.

26 Claims, 12 Drawing Sheets

UNPACK

RECEIVED BYTES ARE DIVIDED INTO (FOR EXAMPLE), 2 BITS PER PIXEL AND ARE STORED IN LINE BUFFER(s). —100

NOISE FILTER

3x3 PIXEL NEIGHBORHOODS ARE PROCESSED TO REVISE VALUE OF CENTRAL PIXEL OF NEIGHBORHOOD TO A VALUE WITHIN MINIMUM AND MAXIMUM PIXEL VALUES OF NEIGHBORHOOD.
- IF CENTRAL PIXEL WITHIN MIN/MAX LIMITS, LEAVE UNCHANGED.
- IF CENTRAL PIXEL OUTSIDE MIN/MAX VALUES, SET CENTRAL PIXEL EQUAL TO CLOSEST MIN/MAX VALUE.

—102

DISPERSE ERROR VALUE TO ROW OF 3x3 NEIGHBORHOOD THAT INCLUDES THE CENTRAL PIXEL, e.g., 50% TO CENTRAL PIXEL, 25% TO EACH OF LEFT AND RIGHT PIXELS. —104

STORE PIXEL VALUES IN LINE BUFFER(s). —106

FIG.8

FOR ANY NEIGHBORHOOD WHERE NO EDGE IS PRESENT

EXAMPLE:

> SELECT PARAMETERS TO CREATE HALFTONE DOTS, AT RESOLUTION OF 150 dpi THROUGH USE OF SCALING PROCEDURE.
> —ASSUME FOR PIXELS IN ODD ROWS:
>   EDGE INDEX = 0
>   H_DELTA = MAX. VALUE;
>   V_DELTA = MAX. VALUE/2;
>   V_SORT FOR ODD PIXELS = DOWN;
>   H_SORT FOR ODD PIXELS = RIGHT;
>   V_SORT FOR EVEN PIXELS = DOWN;
>   H_SORT FOR EVEN PIXELS = LEFT.
> —FOR SUBPIXELS IN EVEN ROWS, REVERSE V_SORT VALUES TO UP.
> —H_DELTA, V_DELTA, H_SORT AND V_SORT VALUE CHOICES AND DEPENDENT ON PARTICULAR HALFTONE PATTERN
— 150

CONTINUE AS INDICATED IN STEPS 130 etc... — 152

FIG.15

METHOD AND APPARATUS FOR IMPROVING IMAGE PRESENTATION IN A DIGITAL COPIER

FIELD OF THE INVENTION

This invention relates to document copiers and, more particularly, to a method and apparatus for improving images produced by such copiers, through use of digital processes.

BACKGROUND OF THE INVENTION

The prior art includes many teachings directed to methods for the improvement of copier image outputs. Such methods cover a wide variety of complex algorithms that involve different combinations of different image processing techniques. Such techniques include edge-detection, pixel smoothing, pixel sharpening, scaling through resolution conversion, and halftoning using one or more dithering techniques. Typically, prior art halftoning techniques have involved simple thresholding, error diffusion or "device-best" cluster dither actions. All of such actions require significant tradeoffs, including user selection of good text/good pictures, complex processing and the use of large buffers for wide area processes and high resolution scanning.

Any system that is intended to be used to improve the quality of scanned images in a copier must deal with a number of potential variables, i.e., halftoned originals, scanned text, a limited printer gamut, unknown black and white values in the original document, etc. Further, any method employed to improve digital image presentation in a copier's document output needs to address the process variables automatically and dynamically so as to enable high quality copies, with high throughput.

Accordingly, it is an object of this invention to provide an improved method and apparatus for maximizing copy quality in a digital copier.

It is another object of this invention to provide an improved method and apparatus for handling digital images in a pipeline fashion, while simultaneously providing improved, higher resolution image documents.

It is yet another object of this invention to provide an improved method and apparatus for handling images that assures improved output image quality.

SUMMARY OF THE INVENTION

The method of the invention improves the presentation of pixel data images in output documents. The method is implemented by a pipeline of image processing actions which, among others, includes an edge evaluation step wherein neighborhoods of pixel data are examined to derive edge values that are indicative of an edge presence in the respective neighborhood. Each edge value is further indicative of the intensity of the edge. The edge evaluation action further determines scaling parameters which enable later distribution of a neighborhood's center pixel tone value to subpixels that are created during a scaling action of the center pixel. The method then applies an interpolated value between plural tone correction values to the center pixel value, with the interpolation is dependent upon the edge intensity value derived for the center pixel's neighborhood. The method then scales the center pixel to a higher level of resolution and, through use of the previously derived scaling parameters, distributes the pixel's tone value to the higher resolution subpixels. The method further employs a halftoning procedure so that pixel neighborhoods having no edge are subjected to a halftone procedure that mimics the scaling procedure, but utilizes predetermined distribution parameters to enable appropriate placement of the halftone dots.

BRIEF DESCRIPTION OF THE DRAWINGS

FIGS. 8–15 are logical flow diagrams, at a high level, which illustrate unpacking, noise-filtering, edge evaluation, sharpen filtering, tone compensation/quantization and halftoning image processing functions that are applied to an image by the processing pipeline of the invention.

DETAILED DESCRIPTION OF THE INVENTION

Figure 1:
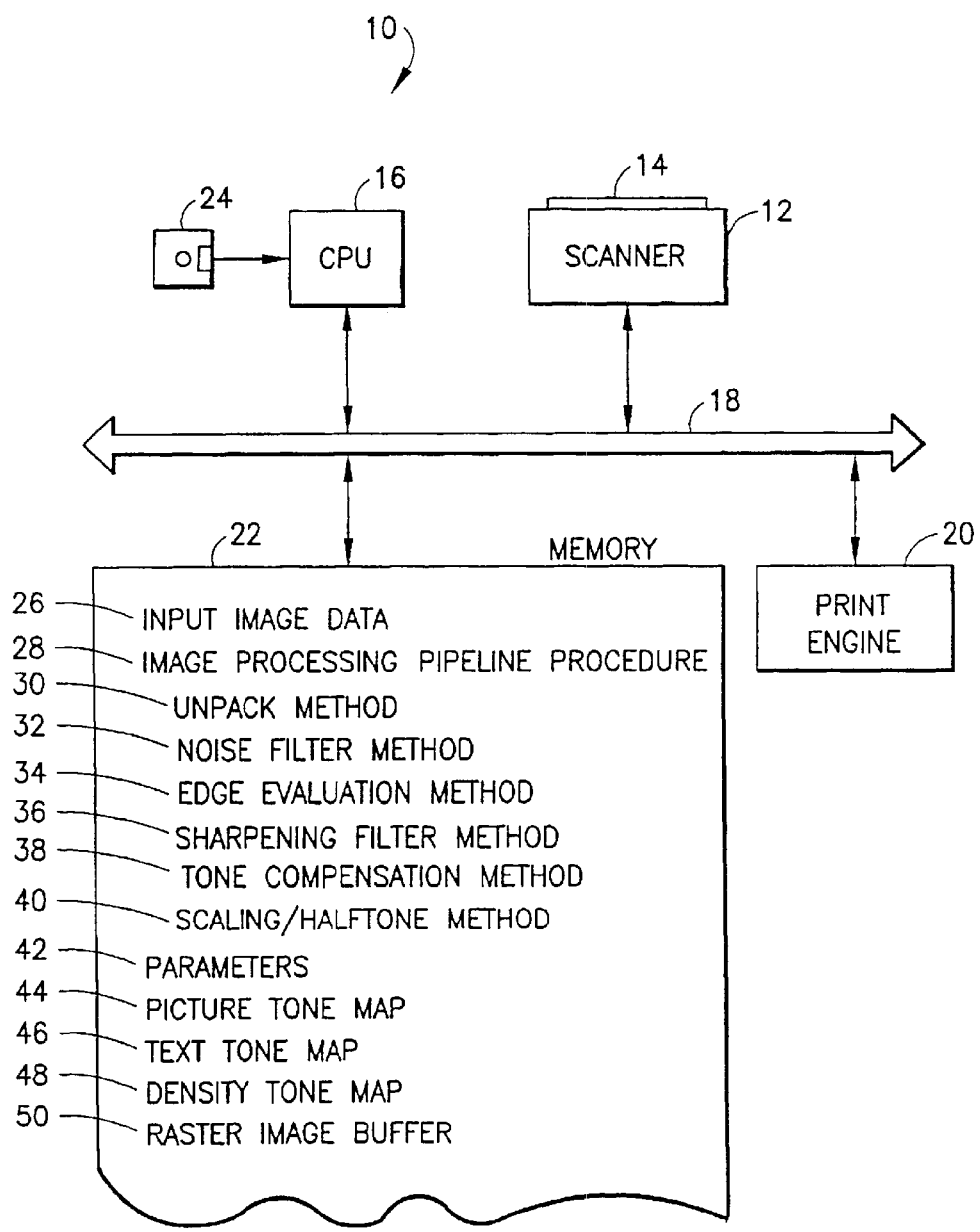
FIG. 1 is a block diagram of a system adapted to carry out the method of the invention.

As will be hereafter understood, the image processing pipeline implemented by a copier incorporating the system of FIG. 1 processes pixels of an image on a "flow-through" basis to improve the ultimate image that is output by the copier's print engine. As shown in FIG. 1, copier 10 includes a scanner 12 which, in the known manner, outputs a stream of digital values indicative of images on a media sheet 14. A central processing unit (CPU 16) provides overall control of the elements of copier 10 and is coupled to those elements via one or more bus systems 18. A print engine 20 is responsive to a stream of digital print values from a raster image buffer to produce a media sheet output. A memory 22 provides both intermediate storage facilities and procedures for carrying out the method of the invention.

While, hereafter, it will be assumed that each of the procedures described below is already loaded into memory 22, one skilled in the art will understand that such procedures could be included on one or more memory devices 24 for loading into CPU 16 on an as-needed basis. Further, while memory 22 is shown as a unitary memory structure, the procedures stored therein may be distributed from read-only memories (not shown) when a particular procedure is to be carried out. Accordingly, memory 22, as the term is used hereafter, is intended to incorporate all memories within copier 10, whether volatile or non-volatile.

Memory 22 includes an input image data buffer 24 which is utilized as a temporary storage area for data received from scanner 12. An image processing pipeline procedure 28 incorporates each of the image improvement methods that are executed during operation of the image pipeline. A first of those methods is an unpack method 30 wherein the input data stream from scanner 12 is broken down into a fixed number of bits per pixel (e.g. 2, 4, 6 etc.) which are then stored in one or more line buffers (not shown).

A noise filter method 32 accomplishes a subtle descreening procedure and removes "outlier" pixel values from the image. Outliers are pixels which deviate significantly in value from their neighbors and are common in scans of halftoned originals, where they can be thought of as noise. Removal of the outliers achieves a number of benefits, i.e., reduction of moire' caused by subsequent halftoning and sharpening filter actions, improved edge detection and improved tone-preservation. A primary constraint on noise filter method 32 is that it must assure that edges are preserved. Details of noise filter method 32 will be discussed below.

Edge evaluation method 34 examines a neighborhood of pixel values surrounding a center pixel and determines whether an edge is present therein and its "strength". It further provides a number of other parameters that indicate the "direction" of the edge and provides control parameters for use during later scaling and halftoning actions of the pipeline. An edge determination is calculated once per input pixel and is then used in subsequent methods that process the pixel.

Sharpening filter method 36 reverses a blurring action that often appears in data that is output by scanner 12 and restores the quality of text image data.

Tone compensation method 38 employs three lookup tables, i.e., a picture tone map 44, text tone map 46 and density tone map 48 to alter pixel values to match the characteristics of print engine 20. As is known, many print engines exhibit non-linear tone transfer characteristics due to various physical phenomena. The prior art has utilized lookup tables to revise input pixel tones to tone values that will, when rendered by print engine 20, appropriately reproduce the input tone values. However, it has been found to be important to differentiate between picture and text regions of an image when applying tone compensation. Accordingly, the pipeline uses a tone compensation method 28 that employs the edge index value found by edge valuation method 34 to determine which lookup table to utilize when deriving a tone compensation value for an image pixel.

Scaling/halftone method 40 utilizes the edge index and tone dispersion parameters developed by edge evaluation method 34 (and stored in parameters region 42) to disperse the pixel's tone to a plurality of subpixels, dependent upon a level of scaling that is being applied.

Hereafter, it will be assumed that the input pixel image has a resolution of 300 dots per inch (dpi) and that the output image has a resolution of 600 dpi. Of course, other scaling values can be implemented by the invention If scaling/halftone method 40 determines that no edge is present in a neighborhood, a halftone action is taken with respect to the neighborhood, using essentially the same procedure as is used during scaling and tone dispersion actions, but employing predetermined halftone parameters. Such parameters are dependent upon the particular halftone resolution that is desired.

The image that is output by image processing pipeline procedure 28 may then be compressed and stored in a raster image buffer 50 or directly sent to print engine 20.

Figure 2:
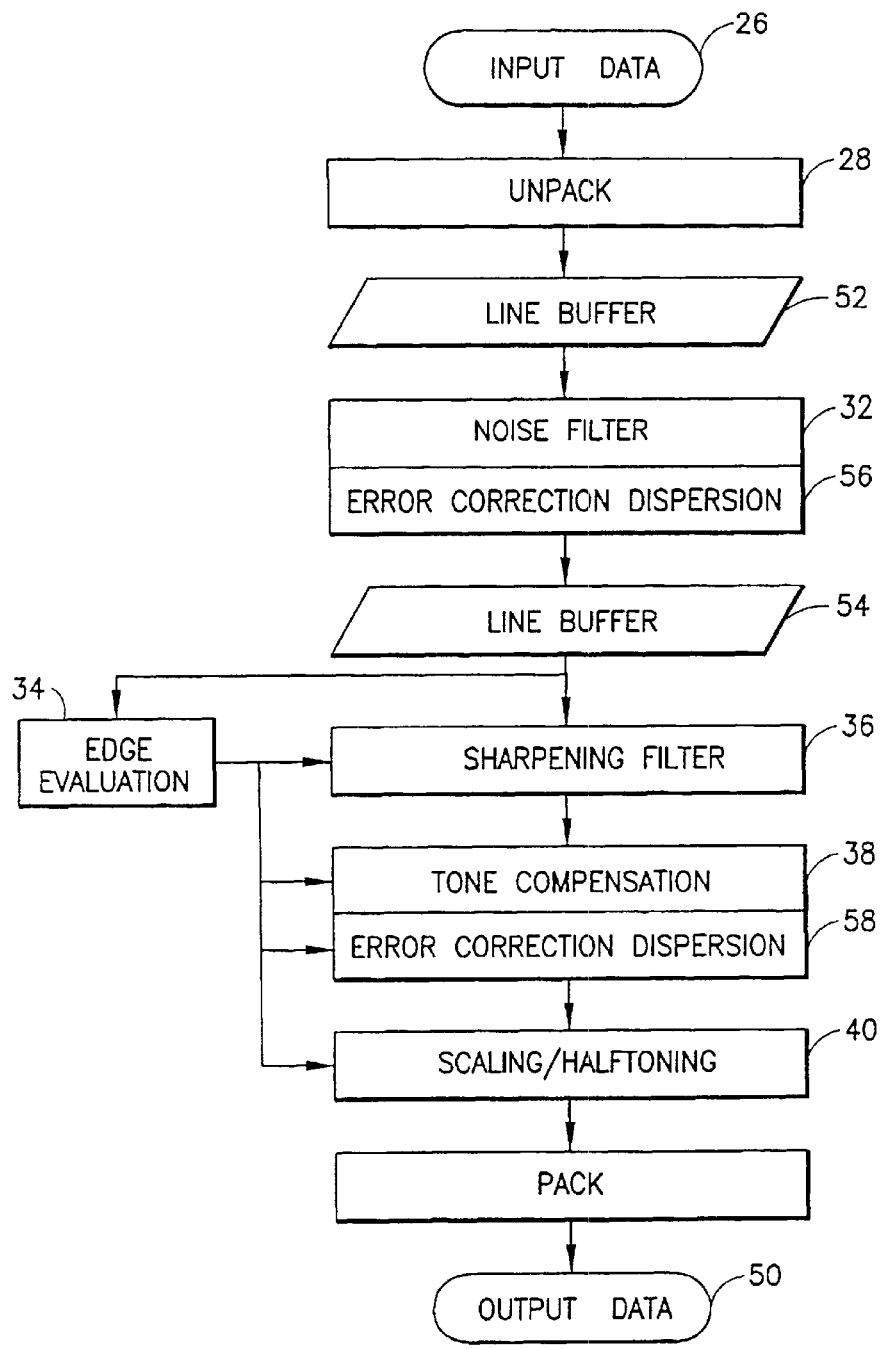
FIG. 2 is a logical flow diagram illustrating the overall procedure of the invention, including image processing steps implemented thereby.

Referring to FIG. 2, the sequence of actions that occur during image processing pipeline procedure 28 are illustrated and are numbered identically as shown in FIG. 1. In addition, line buffers 52 and 54 are incorporated into the procedure to enable temporary buffering of output data from unpack and noise filter methods 28 and 32, respectively. Note also, that tone compensation method 38 employs error correction dispersion actions where the pixel values are quantized within a certain value range (e.g. 0–255 or 8 bit bytes) and any error value is dispersed to one or more adjacent pixels. The action of error correction dispersion methods 56 and 58 will be discussed below in conjunction with noise filter method 32 and tone compensation method 38.

Note further that the showing of edge evaluation method 34 illustrate that its derived parameters are utilized as inputs for the purpose of controlling sharpen filter method 36, tone compensation method 38 and scaling/halftoning method 40.

Figures 3, 4, 5:
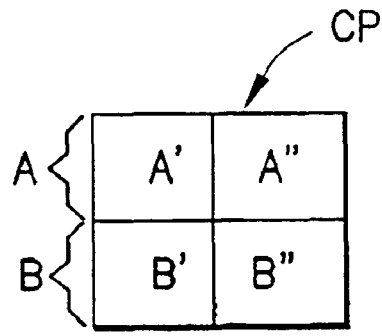
FIG. 3 schematically illustrates a pixel neighborhood that is utilized during the image processing actions.
FIG. 4 illustrates weighting values that are applied to pixels within a neighborhood during a sharpening filter action.
FIG. 5 schematically illustrates a scaling action that is applied to a pixel during a scaling action implemented by the invention.

During the operation of image processing pipeline procedure 28, "neighborhoods" of pixel values are employed. A representative neighborhood is shown in FIG. 3 and comprises a 3×3, matrix of pixel values that are arranged in three rows R1–R3 and three columns C1–C3. Central pixel CP is the pixel being processed with adjoining pixel values RSTU-WXYZ being utilized during the processing. During the operation of image processing pipeline procedure 28, each and every pixel (except for certain edge pixels of the image) are handled in conjunction with the 8 adjoining pixels of the neighborhood to enable determination of certain parameters and characteristics of the image produced by the neighborhood.

While the invention will be hereafter described in the context of a software/firmware programmed processor, it may also be implemented, at least in part, by an application specific integrated circuit (ASIC) or other hardware configuration, such as a field programmable series of gate arrays. In such an embodiment, the logic that underlies the method hereof is performed by hardwired circuits. For example, for each function shown in FIG. 2, there is a corresponding hardware structure that carries out the illustrated function on received pixel values. Accordingly, an ASIC will contain a hardware pipeline that includes modules for performing each indicated function.

The operation of image processing pipeline procedure 28 will now be described in conjunction with the flow diagrams shown in FIGS. 8–15. The neighborhood images shown in FIGS. 4–7 will aid in an understanding of the methods shown in FIGS. 8–15. It is to be understood that each of the steps described below is carried out with respect to each pixel of an image that is received from scanner 12 (FIG. 1).

Referring to FIG. 8, unpack method 30 receives bytes of data from scanner 12 and divides the bytes into, for example, 1, 2, 4 or 8 bits per pixel (assuming a monochrome or gray presentation). The unpacked pixel values are then stored in one or more line buffers (step 100). Thereafter, each central pixel is subjected to noise filter method 32 which, as indicated above, acts to reduce halftone noise, moire' aberrations and false edge detections.

The object of noise filter method 32 is to revise the central pixel value of the neighborhood to a value which falls within minimum and maximum pixel values of the neighborhood. Thus, each of the pixels of 3×3 neighborhood is examined and the maximum and minimum pixel values are found (step 102). Then, if the central pixel value is within the minimum/maximum limits, the central pixel value remains unchanged. Otherwise, the central pixel,value is set to the closest one of the minimum or maximum pixel value.

A revision of the central pixel value creates an error value (i.e., the difference between the original central pixel value and the value to which it is changed). That value is then dispersed to pixels along the row that includes the central pixel. Referring to FIG. 3, those pixels constitute U, CP and W. An exemplary dispersion is to allocate 25% of the error value to each of pixels U and W and 50% to central pixel CP (step 104). As indicated above, this action smoothes the pixel values and removes "outliers". The results of noise filter method 32 are then stored in one or more line buffers (step 106).

Figure 9:
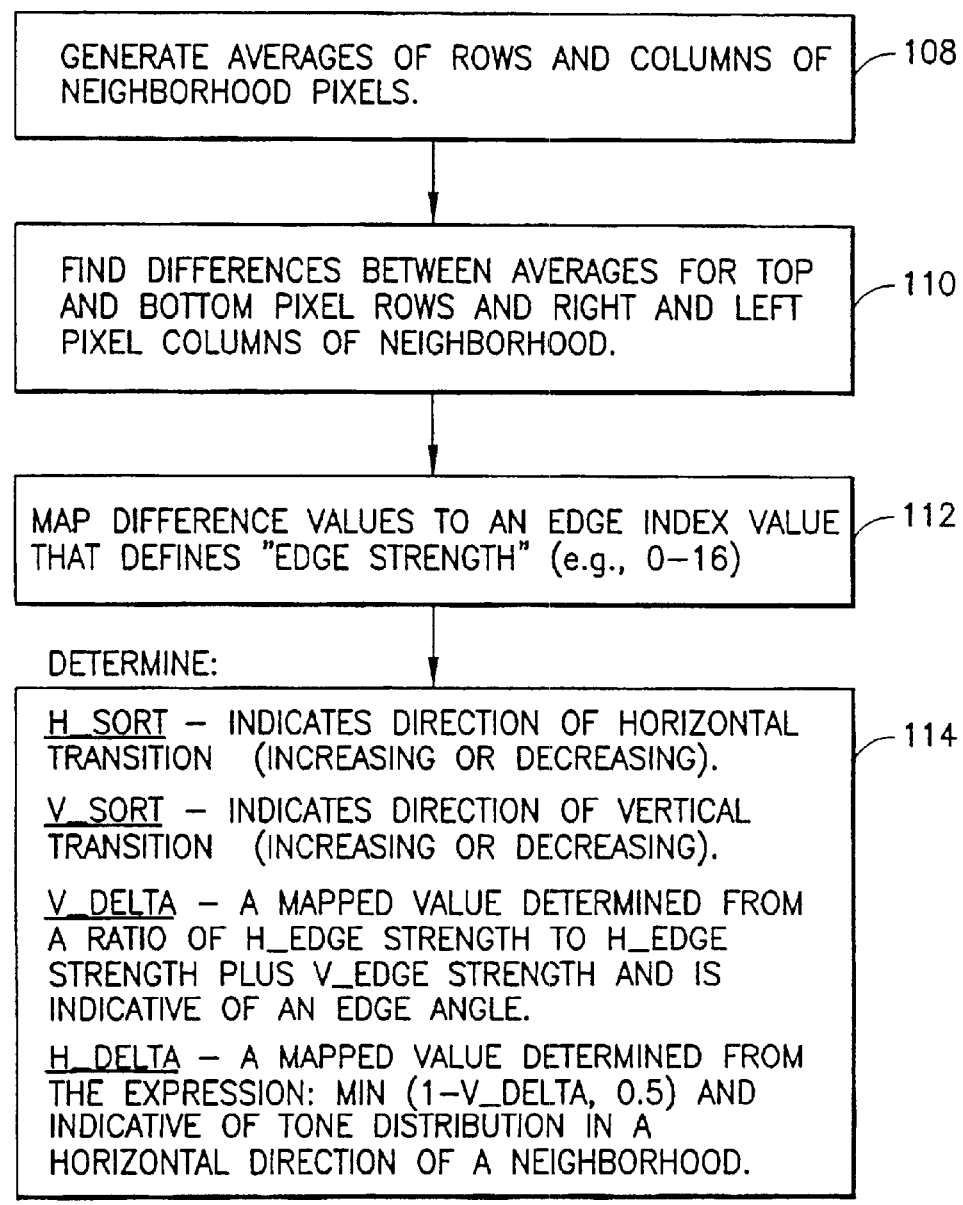

Turning to FIG. 9, a principal action of image processing pipeline procedure 28 is performed wherein parameters are derived which are used to control subsequent pipeline actions to improve the output image quality. Edge evaluation method 36 examines each 3×3 neighborhood to determine if the neighborhood contains an image edge or no edge. If an edge is found, an edge strength is ascribed thereto. Additional parameter values are also calculated which are utilized during the scaling/halftone method 40 to disperse pixel tone values to plural subpixels.

Edge evaluation method 34 commences (step 108) by examining a current pixel neighborhood and generating averages of pixel values in rows and columns thereof. As shown in FIG. 3, pixel values R, S and T are averaged to find an average pixel value for row R1 as are pixels X, Y and Z to find an average pixel value for row R3. Similar actions occur with respect to columns C1 and C3.

Next, differences are found between the averages for the top and bottom pixel rows (R1 and R3) and the right and left pixel columns (C1 and C3) of the neighborhood (step 110). Those difference values are then mapped to horizontal and vertical edge index values that define respective edge "strengths" (step 112). The horizontal and vertical edge values are then combined (e.g., by calculating an average value thereof) to arrive at an overall edge index value for the current neighborhood. For example, the overall edge strength may take a value from 0 to 16, which value is hereafter used in subsequent steps of the procedure.

Additional parameters are now determined that control distribution of pixel tone values to subpixels within center pixel CP during a scaling action to be described below. Those parameters are as follows:

H_sort. If the neighborhood evidences a direction of horizontal transition (increasing or decreasing) across columns C1–C3, the H_sort value is assigned to indicate accordingly.

V_sort. If the neighborhood indicates a direction of vertical transition (increasing or decreasing) between rows R1 and R3, the V_sort value is assigned to indicate accordingly.

V_delta and H_delta. Each delta value is a mapped value that is indicative of the angle of an edge that is present in a neighborhood (FIG. 3). The V_delta value is determined by the ratio of the horizontal edge value to the sum of the horizontal and vertical edge values. Thus, if the vertical edge value is large and the horizontal edge value is small, the ratio approaches 1. By contrast if the vertical edge value is small and the horizontal edge value is large, the ratio approaches 0. In between, the ratio values fall between 0 and 1 and approximate an angle value between 0° and 90° for the edge in the neighborhood.

The H_delta value is determined from the following expression:

$$H\_delta = \min(1 - V\_delta, 0.5).$$

The H_delta value ranges between 0 and 0.5 and is indicative of the horizontal distribution of tone across the pixel neighborhood (step 114).

The mapping of the H_delta and V_delta values are different due to the scaling action that is to occur. Since the scaling action is assumed to be from 300 dpi to 600 dpi, the V_delta mapped value is twice that of the H_delta mapped value. This disparity in the mapped values is due to the fact that the scaling function first divides a pixel to be scaled into top and bottom halves and subsequently divides in half each of the top and bottom halves. This will be better understood when the scaling/halftoning method 40 is discussed below.

Each neighborhood is now subjected to sharpening filter method 36 to add a weighted value to central pixel CP so as to sharpen or smooth the neighborhood pixel values, as the case may be. Sharpening filter method 36 improves image sharpness by reversing blur introduced by the optics of scanner 12 and increases local contrast by magnifying the difference between central pixel CP and its neighbors.

Figure 10:
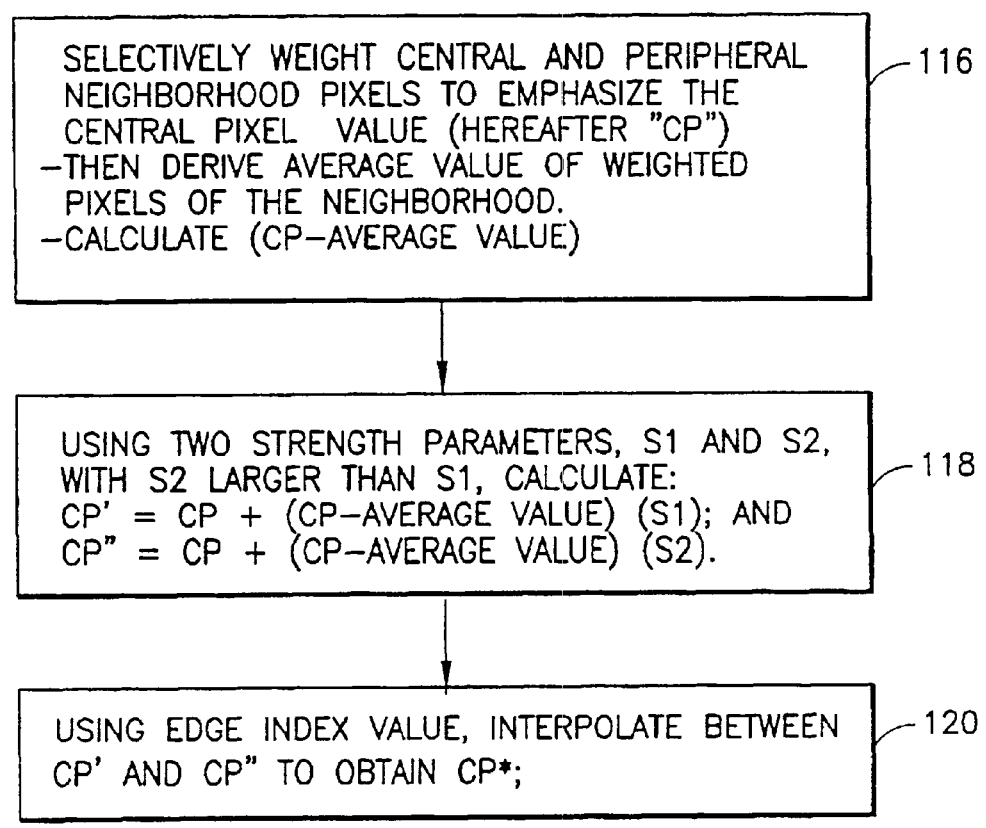

As shown in FIG. 10, sharpening filter method 36 commences by selectively weighting central pixel CP and peripheral neighborhood pixels to emphasize the central pixel value. An example of such weighting values is shown in FIG. 4, wherein central pixel CP is multiplied by 4; neighboring pixels USW and YX2 are multiplied by 2; and pixels RTZ and X are left unchanged. Thereafter, the average value of the weighted pixels of the neighborhood is calculated. Then, a difference is calculated between the weighted value of the central pixel and the calculated average value (step 116). Thereafter (step 118), using two strength parameters, i.e., S1 and S2, with S2 set at a larger value than S1, two sharpening values are calculated for CP, namely, CP' and CP" as follows:

$$CP' = CP + (CP\text{-average value})(S1)$$

$$CP'' = CP + (CP\text{-average value})(S2)$$

Thereafter, the edge index value is utilized to enable an interpolation between the values of CP' and CP" to obtain a central pixel value CP* (step 120). If there is no edge in the neighborhood, value CP' is chosen, and if the edge evidences a maximum strength value, CP" is chosen. Intermediate edges strength values result in CP* taking an interpolated value between CP' and CP".

Figure 11:
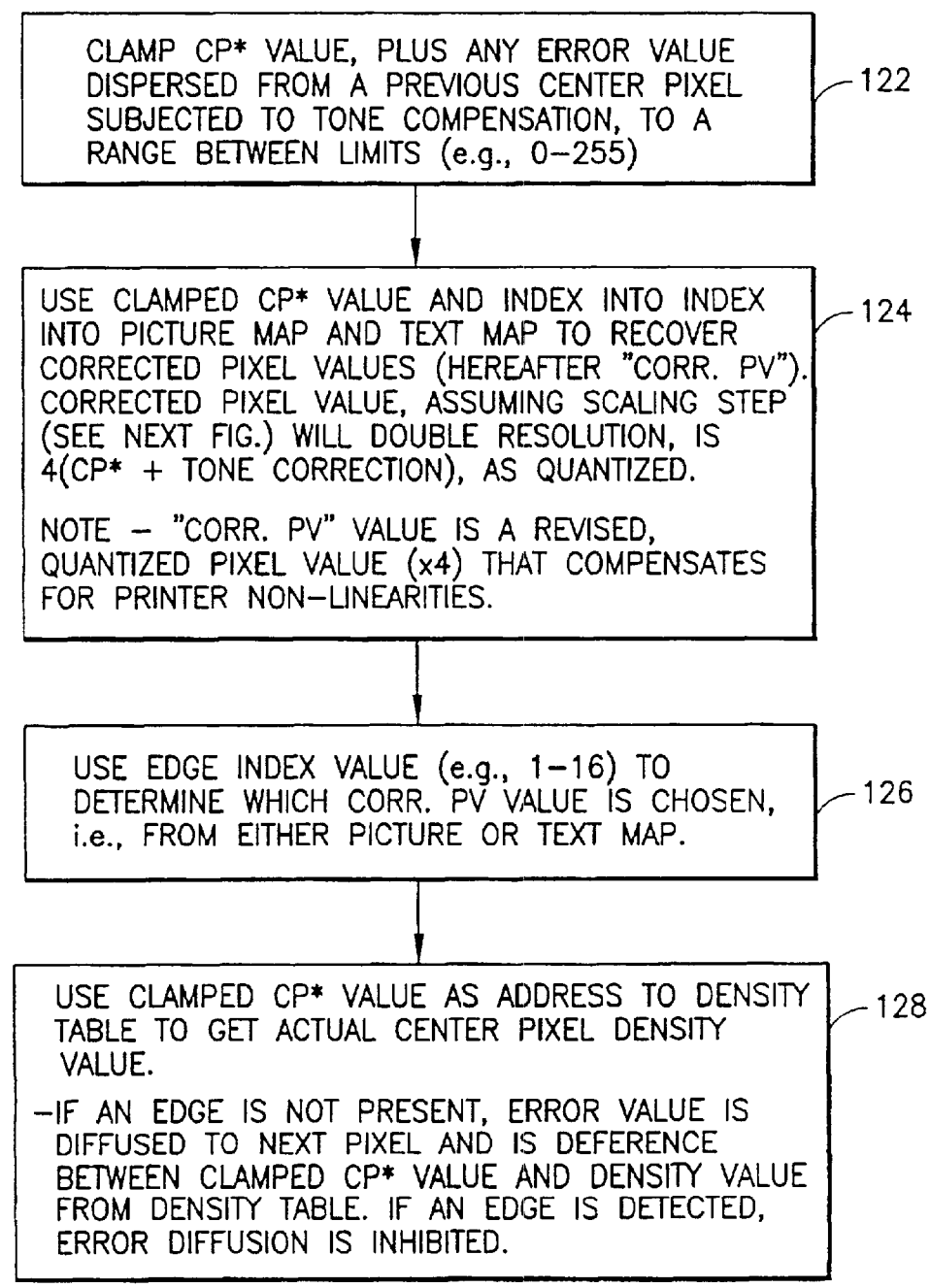
Figure 12:
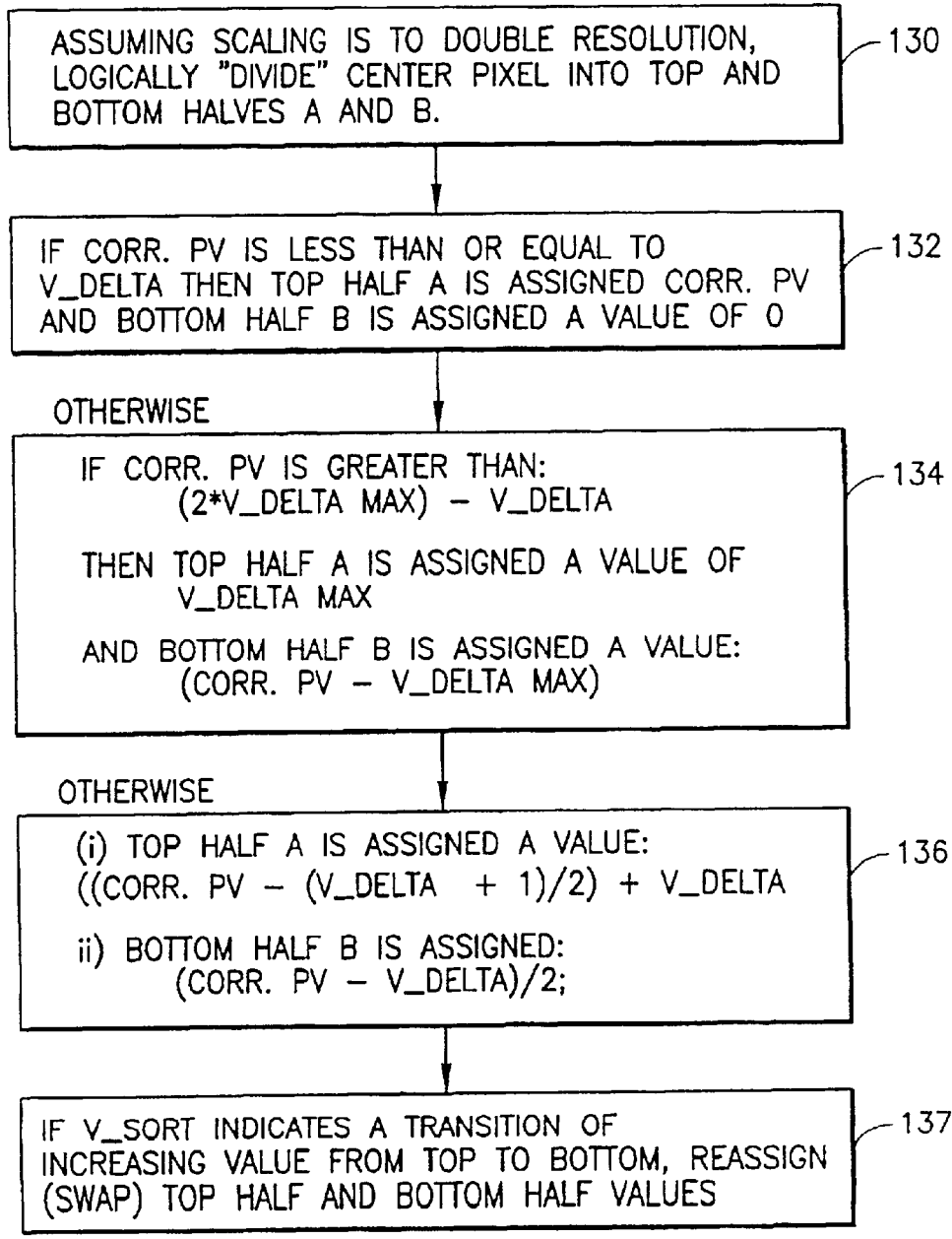
Figure 13:
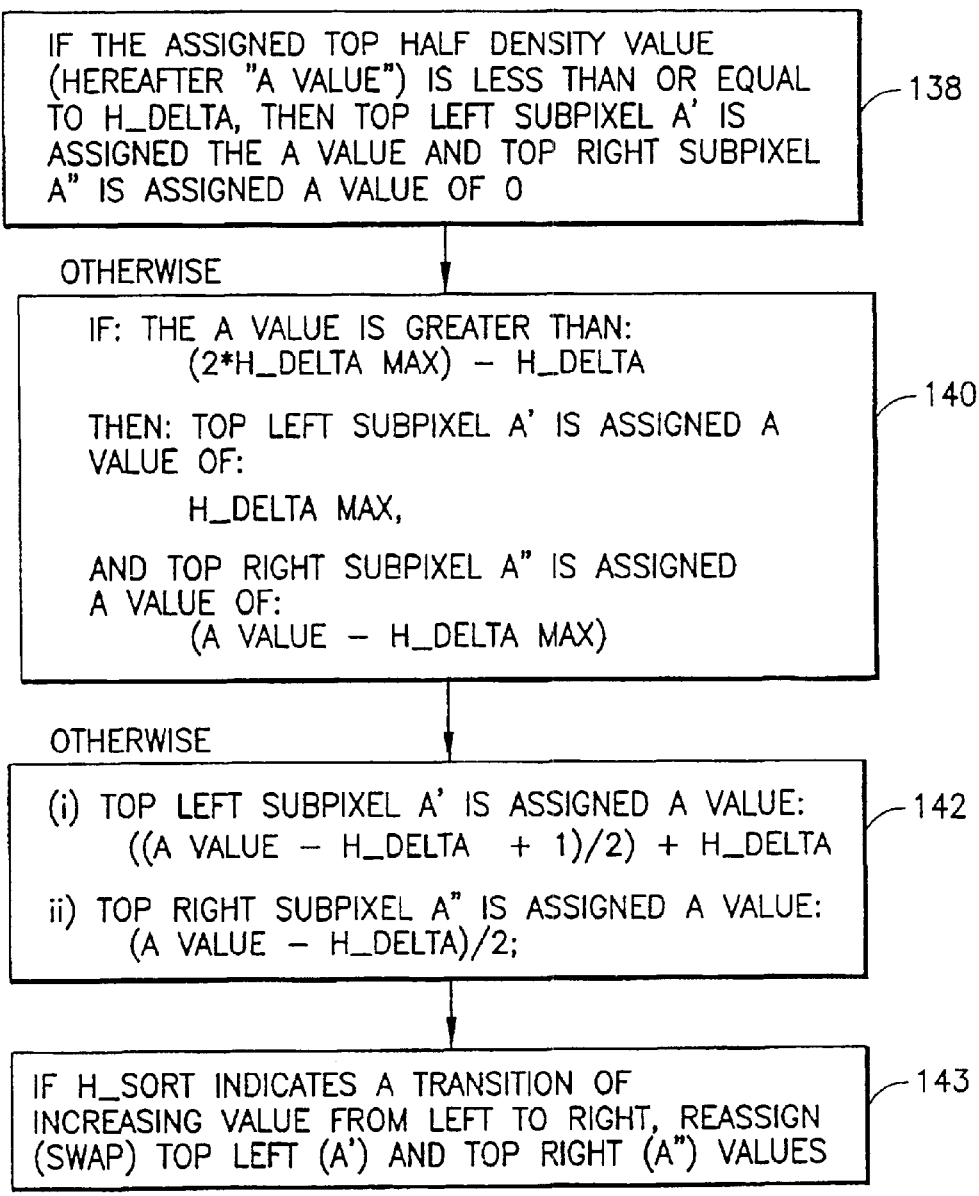
Figure 14:
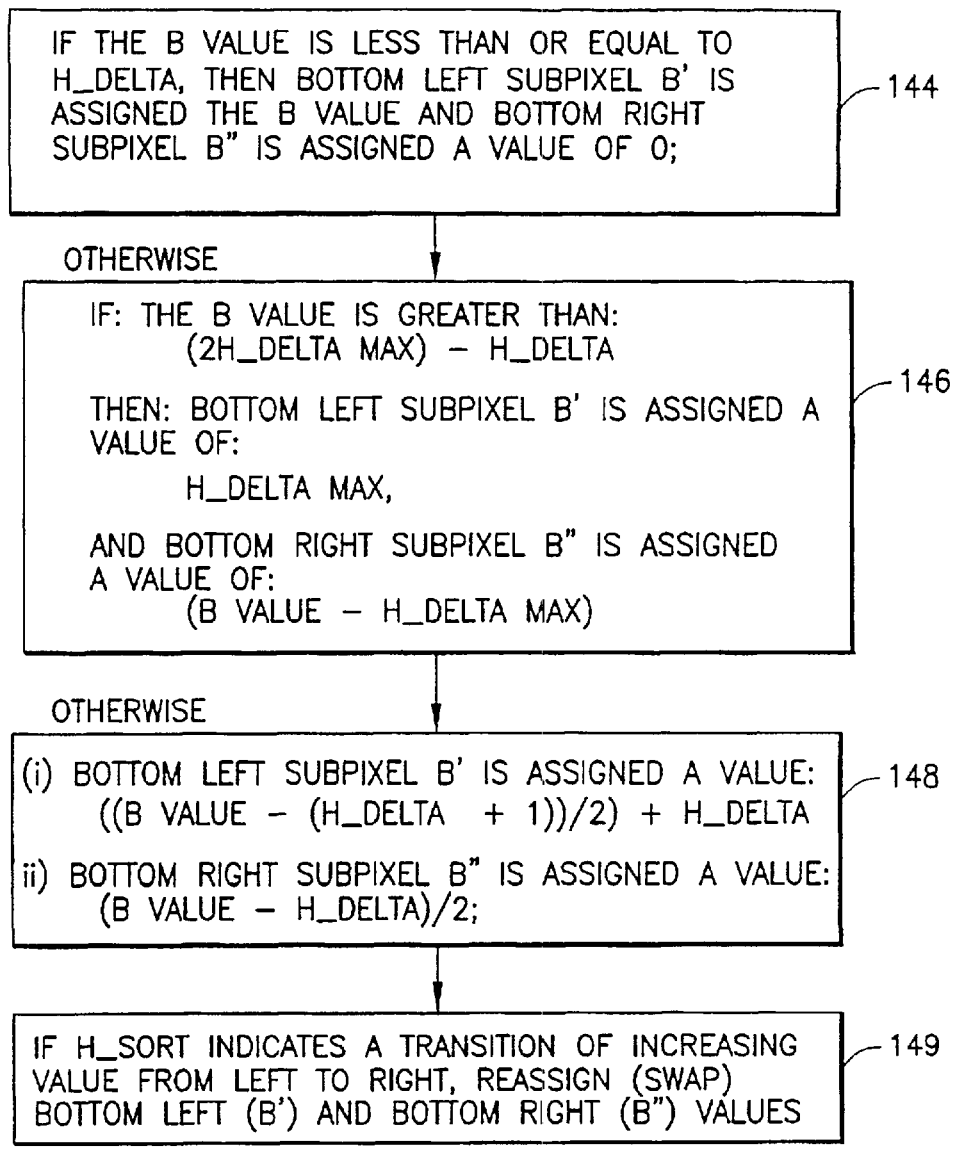

The neighborhood and its included central pixel value CP* are now subjected to tone compensation/quantization method 38 (see FIG. 11). Initially, value CP*, plus any value dispersed from a previous center pixel subjected to tone compensation, are clamped between limits, e.g., 0–255 (step 122).

Three lookup tables are employed with this method, i.e., a picture tone map, a text tone map and a density tone map, all of which enable correction of the clamped value of CP* in such a manner as to compensate for non-linearities of print engine 30. The method starts by utilizing the clamped CP* value (plus any error value that has been dispersed from a previous center pixel subjected to tone compensation) to index into the picture tone map and the text tone map to recover corresponding corrected pixel values.

Because those corrected pixel values are utilized in a scaling step (wherein a 300 dpi to 600 dpi scaling occurs), the corrected pixel values are increased by a factor of 4. Further, the corrected pixel values are quantized to remain within a reduced number of available pixel values (step 124).

Thereafter (step 126), the edge index value derived during edge evaluation method 34 is utilized to determine which corrected pixel value is to be chosen. Thus, if the edge index value indicates the presence of an edge within the neighborhood, the corrected value from the text tone map is chosen. Otherwise, the picture tone map corrected value is utilized.

The edge index value that separates an "edge" from "no edge" may be selected by the user. Hereafter, it will be assumed that if the edge index value exceeds 8(on a scale of 1–16), that an edge is indicated, otherwise an edge index value of 0–8 indicates no edge. If the edge index value is determined to indicate an edge, the diffusion of the error value is inhibited to avoid the creation of "noise" at the edge boundary.

The clamped CP* value is then used as an address into the density table to obtain an actual value of the density which corresponds to the clamped CP* value. A difference is taken between the retrieved density value and the clamped CP* value and that difference is dispersed as an error value to the next central pixel to be considered (step 128).

Scaling/halftoning procedure 40 is now performed (FIG. 12) to achieve a 600 dpi resolution for the image and to achieve a halftoning of regions of the image wherein no edge was found by edge evaluation method 34. It is initially assumed that an edge is present in a current neighborhood being processed. Since the scaling action is to double the ultimate resolution of the image from 300 dpi to 600 dpi (requiring subdivision of each pixel into four subpixels), center pixel CP is initially divided into top and bottom halves, A and B, respectively (see FIG. 5). The corrected pixel value for CP (from tone compensation method 28) is divided between top and bottom halves, A and B. (step 130)

As will be recalled, the V_delta value is a mapped value that is indicative of an angle of an edge within a neighborhood. The value V_delta max is the maximum value that the V_delta can take, e.g., 1.

To accomplish the assignment of the corrected value between halves A and B, the following procedure is followed, subject to the constraint that the distributed density values can be no greater than V_delta max.:

1. If the corrected pixel value is less than or equal to V_delta, then top half A is assigned the corrected pixel value and bottom half B is assigned a value of 0; (step 132) otherwise.

2. If the corrected pixel value is greater than (2V_delta max)-V_delta, then top half A is assigned a value of V_delta max and bottom half B is assigned a value of: (corrected pixel value–V_delta max); (step 134) otherwise 3. (i) Top half A is assigned a value: ((corrected pixel value–V_delta+1)/2)+V_delta.

(ii) Bottom half B is assigned a value: (corrected pixel value–V_delta)/2; (step 136.)

4. If V_sort indicates a transition of increasing value from top to bottom, the top and bottom half values are swapped. (step 137)

Now, upper half pixel (A) is divided into two subpixels, A' and A" (see FIG. 5) and the top tone value is distributed between left and right subpixels A', A" in accordance with the assigned top half density value, H_delta and H_delta max. The calculation is essentially the same as that described above for top and bottom halves A and B, except that it is applied to subpixels A' and A". The procedure is as follows:

1. If the assigned top half density value (hereafter "A value") is less;than or equal to H_delta, then top left subpixel A' is assigned the A value and top right subpixel A" is assigned a value of 0 (step 138); otherwise.

2. If the A value is greater than (2H_delta max)-H_delta, then top left subpixel A' is assigned a value of H_delta max, and top right subpixel A" is assigned a value of: (A value–H_delta max);(step 140) otherwise 3. (i) Top left subpixel A' is assigned a value: ((A value–H_delta+1)/2)+H_delta.

(ii) Top left subpixel A" is assigned a value: (A value–H_delta)/2; (step 142)

4. If the H_sort value indicates a transition of increasing value from left to right, the top left (A') and top right (A") values aree swapped. (step 143)

The distribution of the density value as between subpixels B" and B" is very similar to that described above except that it is dependent upon the assigned bottom half density value (hereafter "B value"). The procedure is as follows:

1. If the B value is less than or equal to H_delta, then bottom left subpixel B' is assigned the B value and bottom right subpixel B" is assigned a value of 0; (step 144) otherwise.

2. If the B value is greater than (2H_delta max)-H_delta, then bottom left subpixel B' is assigned a value of H_delta max, and bottom right subpixel B" is assigned a value of: (B value–H_delta max); (step 146), otherwise 3. (i) Bottom left subpixel B' is assigned a value: 4((B value–(H_delta+1)/2)+H_delta.

(ii) Bottom left subpixel B" is assigned a value: (B value–H_delta)/2; (step 148)

4. If the H_sort value indicates a transition of increasing value from left to right, swap the bottom left (B') value and the bottom right (B") value. (step 149)

At this stage, pixel CP has been scaled to four subpixels and its tone value dispersed to those subpixels in accordance with the delta and sort parameters derived during edge evaluation method 34. It can now be understood why the corrected pixel values, from the picture tone map and text tone map during tone compensation procedure 28 were multiplied by a factor of four. This enabled the corrected CP value to be dispersed amongst the four subpixels, while retaining the overall density required by the original CP value.

The scaling procedure described above assumed that the neighborhood containing CP had been found to include an edge. The halftone portion of the method 40 will now be considered, as applied to a pixel CP whose neighborhood has been found to include no edge (or an edge with a low edge intensity value). The halftone procedure is utilized to distribute halftone dots so as to improve the ultimate presentation of regions of the image that evidence a relatively constant tone density. As will hereafter be understood, the method simulates an edge through use of pre-established parameters and uses those parameters to control a tone dispersion procedure similar to that described above for the scaling action.

Figure 6:
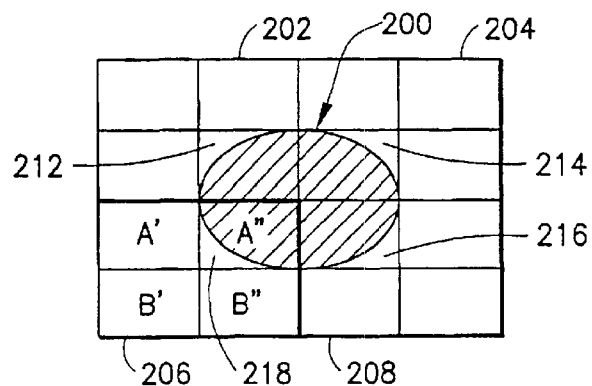
FIG. 6 illustrates the ultimate halftone dot position in a 16 subpixel neighborhood.

It is assumed that the halftone dots will be created at a resolution of 150 dpi. Turning first to FIG. 6, a 4×4 matrix is shown of four pixels 202, 204, 206, and 208, each divided into four subpixels. The lower left four subpixels comprise pixel CP and its subpixels A', A", B' and B", as shown in. FIG. 5. Since it is assumed that the halftone action will constitute a 150 dpi resolution, the ultimate "dot" 200 will appear as shown and will fill subpixels 210, 212, 214 and 216 of the 4×4 pixel matrix.

Figure 7:
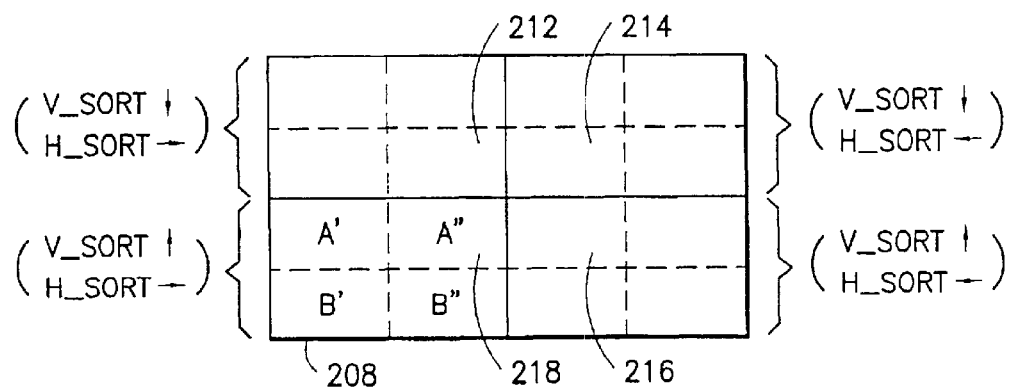
FIG. 7 illustrates a four-pixel neighborhood and the parameters that are utilized to create a halftone thereof.

To achieve such a halftone pattern, the tone dispersion within each of pixels 202, 204, 206, and 208 must be arranged in such a way that the tone is dispersed to the respective subpixels which will constitute a portion of dot 200. Thus, as shown in FIG. 7, the V_sort and H_sort values for each pixel are assigned top/bottom or right/left values to cause the tone of the pixel to be assigned to a subpixel to achieve halftone dot 200. Thus, pixel 202 indicates that the V_sort value is "down" while the H_sort value is "right". Pixel 204 indicates that its V_sort value is the same, but the H_sort value is "left". Accordingly, these values will cause a tone migration into subpixels 212 and 214, respectively. In a similar manner, the V_sort and H_sort values assigned to pixels 208 and 206 will cause tone migrations into subpixels 218 and 216, respectively. As can thus be seen, the selection of the sort values is dependent upon the particular halftone pattern that is desired.

The selection of the H_delta and V_delta values is also dependent upon the particular halftone pattern to be produced. In this instance, H_delta, in lieu of being a measured value, is a given parameter and, for this example, will be assumed to be equal to H_delta max. Similarly, the V_delta value is assumed to be V_delta max/2. The V_sort and H_sort values are as shown in FIG. 7, but differ for odd and even pixels along a row. Further, for subpixels in even rows, the V_sort values are reversed. Different choices of the values of H_delta and V_delta will enable the background to be varied as to tone (i.e., gray level).

The above-indicated assigned values are noted in step 150 of FIG. 15. Thereafter, the identical procedure that was used to distribute density values among subpixels, as shown in steps 130–149, is repeated using the assigned values to accomplish distribution of the density values to indicate the desired halftone pattern. (step 152)

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A method for processing an image of pixel data, to improve presentation thereof, comprising the steps of:
   a) evaluating neighborhoods of said pixel data to derive, for a center pixel of each neighborhood, (i) an associated edge value that is indicative of a magnitude of tone change across said neighborhood, said level of tone change indicative of an edge intensity and (ii) scaling parameters for distribution of a center pixel value to subpixels within said center pixel;
   b) using said scaling parameters and said associated edge value, scaling said center pixel value to a higher level of resolution and distributing said center pixel value to subpixels created by said scaling; and
      wherein said parameters determined in step a) are dependent upon a direction of change of said edge value and differences in tone change across said neighborhood.

2. The method as recited in claim 1, wherein said parameters that are dependent upon said direction of change comprise horizontal and vertical sort directions.

3. The method as recited in claim 2, wherein said parameters that are dependent upon said differences in tone change across said neighborhood comprise vertical and horizontal delta values, wherein a vertical delta value is indicative of an edge angle within a neighborhood and a horizontal delta value is indicative of a tone distribution in said neighborhood in a horizontal direction.

4. The method as recited in claim 3, wherein step b) employs said horizontal and vertical sort directions to determine pixel tone value placements, respectively, within horizontally oriented subpixels and vertically oriented subpixels of said center pixel.

5. The method as recited in claim 3, wherein step b) employs said horizontal and vertical delta values to determine pixel tone value distributions respectively between horizontally oriented subpixels and vertically oriented subpixels within said center pixel.

6. The method as recited in claim 1, further comprising the step of:
   a1) tone correcting said center pixel value through use of said edge value associated with said center pixel value.

7. The method as recited in claim 6, wherein said tone correcting employs said edge value to determine which of one of plural tone corrections is to be employed.

8. The method as recited in claim 3, wherein if step a) determines that said edge value is indicative of an absence of an edge within said neighborhood, said method implements the additional step of:
   d) employing predetermined horizontal and vertical delta values, and horizontal and vertical sort values to distribute center pixel tone values to subpixels within said center pixel so as to create a halftone pattern within non-edge neighborhoods.

9. The method as recited in claim 8, wherein said predetermined horizontal and vertical delta values, and horizontal and vertical sort values are set so as to place a tone value in a subpixel in accord with a predetermined halftone pattern.

10. The method as recited in claim 1, wherein step a) is preceded by the filtering steps of:
    examining each neighborhood of said pixel data to determine minimum and maximum pixel values of pixels comprising said neighborhood;
    revising a value of said center pixel to a closest of said minimum or maximum value, if said center pixel value is outside of said minimum and maximum values; and
    dispersing a difference between the revised value of said central pixel and either said minimum value or said maximum value, as the case may be, to pixels in a row of pixels of said neighborhood that includes said central pixel.

11. The method as recited in claim 1, wherein step a) is followed by the filtering steps of:
    selectively weighting pixels of a neighborhood of said pixel data to emphasize a central pixel value thereof;
    deriving an average value of weighted pixels of said neighborhood;
    calculating higher and lower average values based on higher and lower strength parameters; and
    using said edge value and an interpolation based thereon, determining a central pixel value for further processing that lies between said higher and lower average values.

12. A memory media for controlling a computer to process an image of pixel data, to improve presentation thereof, said memory media comprising:
    a) means for controlling said computer to evaluate neighborhoods of said pixel data to derive, for a center pixel of each neighborhood, (i) an associated edge value that is indicative of a magnitude of tone change across said neighborhood, said level of tone change indicative of an edge intensity and (ii) scaling parameters for distribution of a center pixel value to subpixels within said center pixel;
    a1) means for controlling said computer to tone correct said center pixel value through use of said edge value associated with said center pixel value; and
    b) means for controlling said computer to use said scaling parameters and said associated edge value, to scale said center pixel value to a higher level of resolution and to distribute said center pixel value to subpixels created by said scaling.

13. The memory media as recited in claim 12, wherein said parameters determined by means a) are dependent upon a direction of change of said edge value and differences in tone change across said neighborhood.

14. The memory media as recited in claim 13, wherein said parameters that are dependent upon said direction of change comprise horizontal and vertical sort directions.

15. The memory media as recited in claim 14, wherein said parameters that are dependent upon said differences in tone change across said neighborhood comprise vertical and horizontal delta values, wherein a vertical delta value is indicative of an edge angle within a neighborhood and a horizontal delta value is indicative of a tone distribution in said neighborhood in a horizontal direction.

16. The memory media as recited in claim 15, wherein means b) employs said horizontal and vertical sort values to determine pixel tone value placements, respectively, within horizontally oriented subpixels and vertically oriented subpixels of said center pixel.

17. The memory media as recited in claim 15, wherein means b) employs said horizontal and vertical delta values to determine pixel tone value
distributions respectively between horizontally oriented subpixels and vertically oriented subpixels within said center pixel.

18. The memory media as recited in claim 12, wherein tone correcting employs said edge value to determine which of one of plural tone corrections is to be employed.

19. The memory media as recited in claim 15, wherein if means a) determines that said edge value is indicative of an absence of an edge within said neighborhood, said memory media further comprises:
means for controlling said computer to employ predetermined horizontal and vertical delta values, and horizontal and vertical sort values to distribute center pixel tone values to subpixels within said center pixel so as to create a halftone pattern within non-edge neighborhoods.

20. The memory media as recited in claim 19, wherein said predetermined horizontal and vertical delta values, and horizontal and vertical sort values are set so as to place a tone value in a subpixel in accord with a predetermined halftone pattern.

21. The memory media as recited in claim 12, wherein the operation of means a) is preceded by the following means:
means for controlling said computer to examine each neighborhood of said pixel data to determine minimum and maximum pixel values of pixels comprising said neighborhood;
means for controlling said computer to revise a value of said center pixel to a closest of said minimum or maximum value, if said center pixel value is outside of said minimum and maximum values; and
means for controlling said computer to disperse a difference between the revised value of said central pixel and either said minimum value or said maximum value, as the case may be, to pixels in a row of pixels of said neighborhood that includes said central pixel.

22. The memory media as recited in claim 12, wherein the operation of means a) is followed by operation of the following means:
means for controlling said computer to selectively weight pixels of a neighborhood of said pixel data to emphasize a central pixel value thereof;
means for controlling said computer to derive an average value of weighted pixels of said neighborhood;
means for controlling said computer to calculate higher and lower average values based on higher and lower strength parameters; and means for controlling said computer to use said edge value and an interpolation based thereon, determining a central pixel value for further processing that lies between said higher and lower average values.

23. A method for processing an image of pixel data, to improve presentation thereof, comprising the steps of:
a) evaluating neighborhoods of said pixel data to derive, for a center pixel of each neighborhood, (i) an associated edge value that is indicative of a magnitude of tone change across said neighborhood, said level of tone change indicative of an edge intensity and (ii) scaling parameters for distribution of a center pixel value to subpixels within said center pixel;
a1) tone correcting said center pixel value through use of said edge value associated with said center pixel value; and
b) using said scaling parameters and said associated edge value, scaling said center pixel value to a higher level of resolution and distributing said center pixel value to subpixels created by said scaling.

24. The method of claim 23 wherein said tone correcting employs said edge value to determine which of one of plural tone corrections is to be employed.

25. A method for processing an image of pixel data, to improve presentation thereof, comprising the steps of:
a) evaluating neighborhoods of said pixel data to derive, for a center pixel of each neighborhood, (i) an associated edge value that is indicative of a magnitude of tone change across said neighborhood, said level of tone change indicative of an edge intensity and (ii) scaling parameters for distribution of a center pixel value to subpixels within said center pixel;
b) using said scaling parameters and said associated edge value, scaling said center pixel value to a higher level of resolution and distributing said center pixel value to subpixels created by said scaling; and
wherein step a) is preceded by the filtering steps of:
examining each neighborhood of said pixel data to determine minimum and maximum pixel values of pixels comprising said neighborhood;
revising a value of said center pixel to a closest of said minimum or maximum value, if said center pixel value is outside of said minimum and maximum values; and
dispersing a difference between the revised value of said central pixel and either said minimum value or said maximum value, as the case may be, to pixels in a row of pixels of said neighborhood that includes said central pixel.

26. A method for processing an image of pixel data, to improve presentation thereof, comprising the steps of:
a) evaluating neighborhoods of said pixel data to derive, for a center pixel of each neighborhood, (i) an associated edge value that is indicative of a magnitude of tone change across said neighborhood, said level of tone change indicative of an edge intensity and (ii) scaling parameters for distribution of a center pixel value to subpixels within said center pixel;
b) using said scaling parameters and said associated edge value, scaling said center pixel value to a higher level of resolution and distributing said center pixel value to subpixels created by said scaling; and
wherein step a) is followed by the filtering steps of:
selectively weighting pixels of a neighborhood of said pixel data to emphasize a central pixel value thereof;
deriving an average value of weighted pixels of said neighborhood;

calculating higher and lower average values based on higher and lower strength parameters; and using said edge value and an interpolation based thereon, determining a central pixel value for further processing that lies between said higher and lower average values.

* * * * *